CATHODE RAY TUBE FOCUSING AND CONVEYING SYSTEM

Original Filed Jan. 12, 1968 3 Sheets-Sheet 1

CATHODE RAY TUBE FOCUSING AND CONVEYING SYSTEM

Original Filed Jan. 12, 1968 3 Sheets-Sheet 1

CATHODE RAY TUBE FOCUSING AND CONVEYING SYSTEM
Original Filed Jan. 12, 1968 3 Sheets-Sheet 3
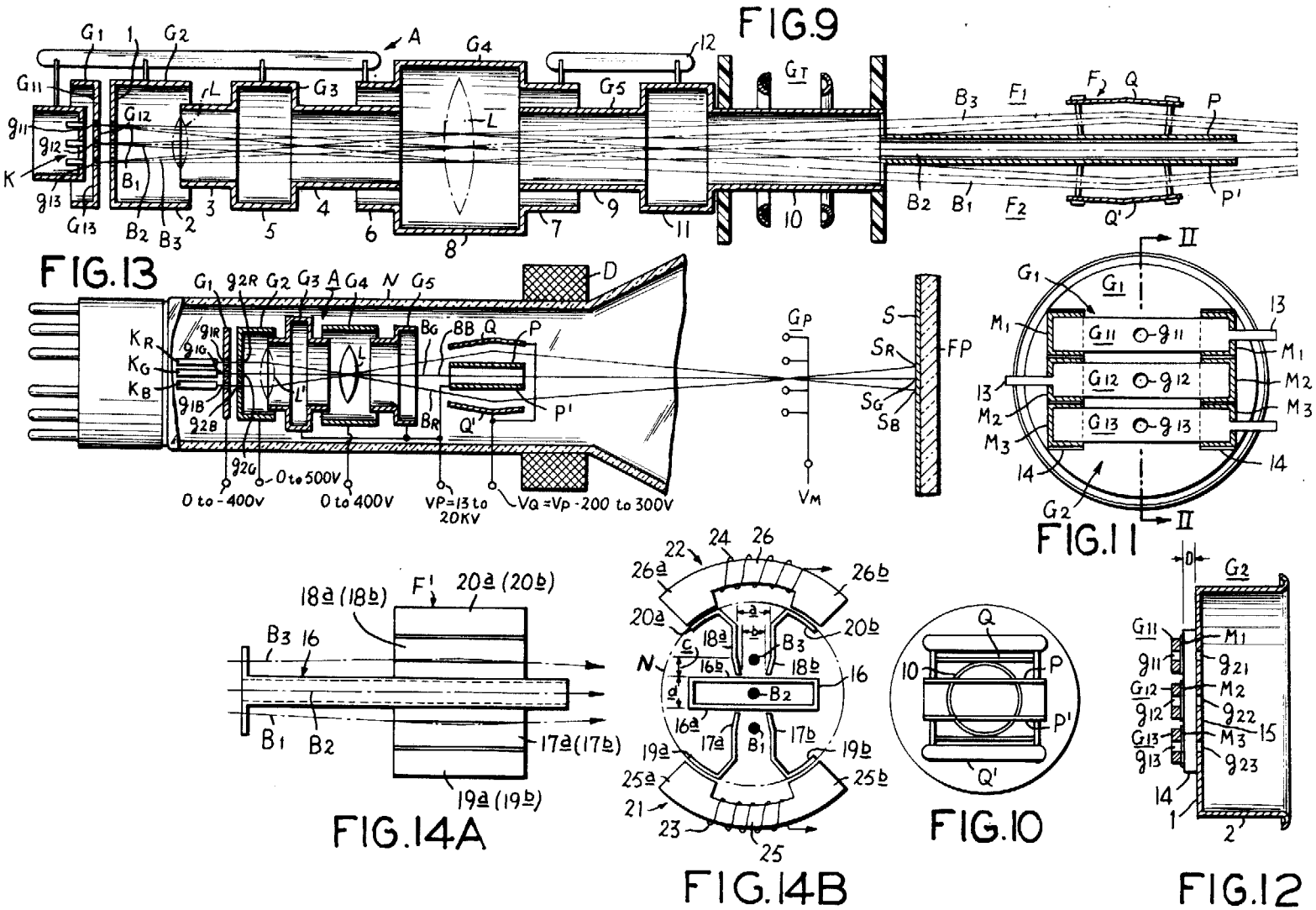

United States Patent Office

Re. 27,751
Reissued Sept. 11, 1973

27,751

CATHODE RAY TUBE FOCUSING AND CONVERGING SYSTEM

Susumu Yoshida and Akio Ohgoshi, Tokyo, Senri Miyaoka, Fujisawa, and Yoshiharu Katagiri, Tokyo, Japan, assignors to Sony Corporation, Tokyo, Japan Original No. 3,448,316, dated June 3, 1969, Ser. No. 697,414, Jan. 12, 1968. Application for reissue Oct. 13, 1971, Ser. No. 188,847

Int. Cl. H01j *29/56, 31/20*

U.S. Cl. 313—69 C 32 Claims

Matter enclosed in heavy brackets [ ] appears in the original patent but forms no part of this reissue specification; matter printed in italics indicates the additions made by reissue.

ABSTRACT OF THE DISCLOSURE

A color picture tube or other cathode ray tube employing a plurality of electron beams includes a single electron gun having one or more cathodes emitting electrons formed into the plurality of beams which are made to converge or cross each other substantially at the optical center of an electrostatic focusing lens by which the beams are focused on the electron-receiving screen of the tube, whereby to avoid spherical aberration and/or coma. When the beams focused on the electron-receiving screen are all to converge at a common point on such screen, an electrostatic or magnetic deflection device acts on those beams which diverge after passing through the lens-like focusing system.

This invention generally relates to cathode ray tubes, and more particularly is directed to improvements in color cathode ray tubes of the type in which a single electron gun is provided for emitting a plurality of electron beams to produce a color picture, for example, as in color television receivers.

Existing color picture tubes are usually of the multi-gun type and include three independent electron gun emitting respective electron beams which are modulated by corresponding color signals and acted upon by a grid system so as to be focused on a collector or electron-receiving screen which may be simply a phosphor or luminescent screen or a phosphor screen with a perforated electrode or shadow mask in front thereof. The three electron guns have to be aligned with respect to each other so that the emitted electron beams converge at the electron-receiving screen. Such color picture tubes of the multi-gun type are disadvantageous in that it is difficult to obtain and maintain the precise alignment of the three electron guns required for the convergence of their beams on the electron-receiving screen and any misconvergence of the beams causes deterioration of the quality and resolution of the color picture that results. Further, when using three independent electron guns to produce the beams, the color picture tube is necessarily costly and, by reason of the space required for the three guns, the possible miniaturization of the tube is correspondingly limited.

In an attempt to avoid the above mentioned disadvantages and limitations of the existing color picture tubes of the multi-gun type, it has been proposed to provide a color picture tube of the single-gun, plural-beam type in which a single electron gun emits three beams from either three respective cathodes or a single cathode, and the three electron beams are passed through a lens-like focusing system, so as to converge at the electron-receiving screen. However, in the tubes of the single-gun, plural-beam type heretofore proposed, no more than one of the electron beams passes through the lens-like focusing system at the optical axis of the latter, and the beams that pass through the focusing system at a distance from the optical axis are subject to coma and spherical aberration. By reason of such coma and spherical aberration and the consequent deterioration of the quality of the color picture that results, color picture tubes of the single-gun, plural-beam type have not enjoyed any wide-spread use.

Accordingly, it is an object of this invention to provide a cathode ray tube of the single-gun, plural-beam type which is free of the above mentioned disadvantages characteristic of tubes of that type as previously proposed, and which is particularly suited to serve as a color picture tube for producing color pictures of high resolution and brightness.

Another object of this invention is to provide a cathode ray tube, particularly a color picture tube, which is of the single-gun, plural-beam type and can be relatively easily manufactured even when miniaturized to a considerable degree.

Still another object of this invention is to provide a color picture tube of the single-gun, plural-beam type in which correction for convergence can easily be effected.

In accordance with an aspect of this invention, a cathode ray tube adapted for use as the picture tube of a color television receiver is provided with a single electron gun including a cathode structure emitting electrons which are formed, as by a grid structure, into a plurality of electron beams, and such beams are made to converge substantially at the optical center of a lens-like, electrostatic focusing means which is common to all the beams and focuses the beams on the electron-receiving screen, whereby the introduction of optical errors such as spherical aberration and/or coma is avoided.

In cases where the electron beams are emitted parallel to each other, the convergence of the beams at the optical center of the lens-like focusing means in accordance with this invention is effected by auxiliary electrostatic lens means located between the grid structure which forms the electron beams and the focusing means.

Further, when it is desired that the beams focused on the electron-receiving screen should be converged at a common point on the screen, the beams which diverge from the lens-like focusing means are acted upon by either electrostatic or magnetic deflection means located between the focusing means and the screen.

The above, and other objects, features and advantages of this invention, will become apparent from the following detailed description of illustrative embodiments which is to be read in conjunction with the accompanying drawings, in which:

FIG. 9 is a schematic longitudinal sectional view of an electron gun in accordance with the embodiment of this invention represented by the optical analogy of FIG. 5;

FIG. 10 is an end view of the gun shown on FIG. 9;

FIG. 11 is an enlarged elevational view showing details of first and second grids of the electron gun according to the embodiment of this invention shown in FIG. 9;

FIG. 12 is a sectional view taken along the line 11—11 on FIG. 11;

FIG. 13 is a schematic, axial sectional view of a chromatron type color cathode ray tube embodying the present invention; and FIGS. 14A and 14B are respectively a plan view and an end view of magnetic deflection means which can be used for converging the electron beams in a cathode ray tube according to this invention.

In order that the electron gun for a cathode ray tube according to the present invention may be better understood, the principles and features of conventional electron guns employing the triple-gun system and the single-gun, triple-beam system, respectively, will first be described in detail with reference to FIGS. 1 to 4.

Figure 1:
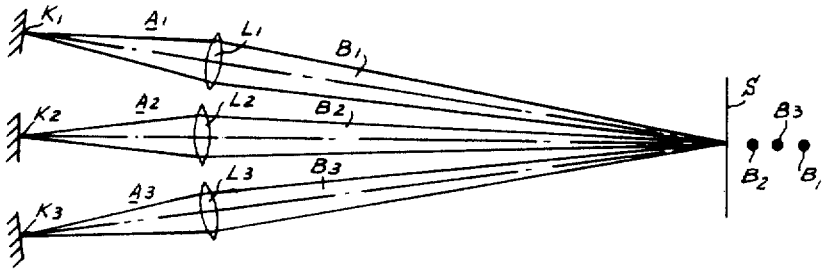
FIG. 1 is a diagrammatic view illustrating the optical equivalent or analogy of a three electron gun system, as in a conventional color cathode ray tube.

FIG. 1 shows the optical equivalent or analogy of a conventional system employing three independent electron guns $A_1$, $A_2$ and $A_3$. In such system, there are provided three independent beam generating sources $K_1$, $K_2$ and $K_3$ emitting three beams $B_1$, $B_2$ and $B_3$, respectively, which are focused onto an electron-receiving or phosphor screen S through separate main lens systems $L_1$, $L_2$ and $L_3$, respectively. With such an arrangement, however, the three independent electron guns $A_1$, $A_2$ and $A_3$ which need to be accommodated in the neck portion of the tube envelope obviously restrict the extent to which the diameter of the neck portion can be reduced. Further, if the effective diameter of each electron gun is limited so as to permit the accommodation of the three guns in a neck portion of reasonable diameter, the outer portions of each beam necessarily pass through parts of the respective main lens system $L_1$, $L_2$ or $L_3$ which are spaced substantially from the optical axis thereof whereby spherical aberration results with the consequence that each beam impinges on the screen S as a relatively large spot, as indicated at the right-hand side of FIG. 1, and high resolution cannot be obtained. It will also be apparent that, in using three independent electron guns, it is inherent that difficulties will be encountered in obtaining and maintaining the precise alignment of the guns necessary for converging the beams $B_1$, $B_2$ and $B_3$ at screen S.

Figure 2:
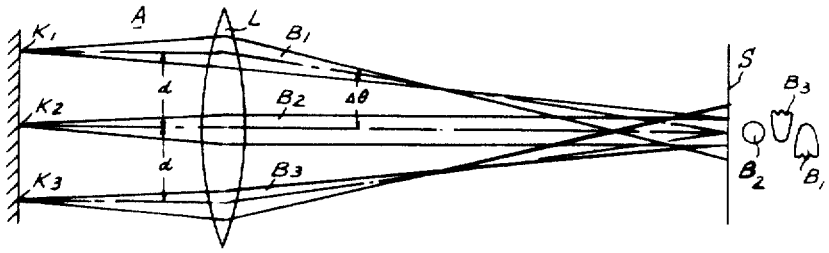
FIGS. 2 and 3 are similar diagrammatic views of the optical equivalent or analogy of a single-gun, plural-beam system, as previously proposed.
Figure 3:
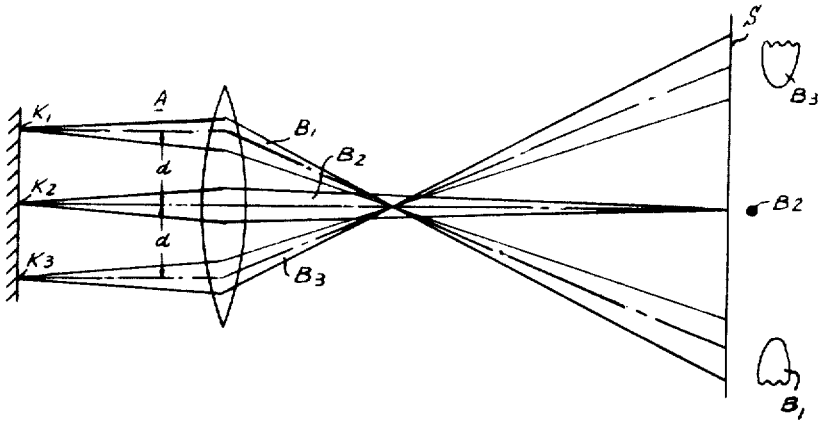

FIG. 2 shows the optical equivalent of a conventional single-gun, triple-beam system in which the single electron gun A includes equivalent beam generating sources $K_1$, $K_2$ and $K_3$ spaced from each other by the distances d and from which three beams $B_1$, $B_2$ and $B_3$ are emitted in parallel to each other so as to pass through the common main lens system L and be converged by the latter on the screen S.

Whether the electron gun system of a color cathode ray tube is of the triple-gun type (FIG. 1) or of the single-gun triple-beam type (FIG. 2), it is necessary that the three electron beams be converged at an angle of $\Delta\theta$ between the center beam ($B_2$ in the drawing) and each of the other beams so that the three beams cross or intersect each other at the position of a mask or grid provided in front of the phosphor or luminescent screen and are thus made to land or impinge on respective color dots or stripes which are adapted to produce different color light rays.

In order to meet the foregoing requirements with respect to the angle $\Delta\theta$ in the single-gun, triple-beam system, it is essential that the three beams $B_1$, $B_2$ and $B_3$ be spaced apart from each other by the substantial distance d when they pass through the main lens L. Thus, beams $B_1$ and $B_3$ pass through portions of lens L which are spaced substantially from the axis of the lens L by the distance d, so that the beam spots on the screen S are deformed, as shown at the right-hand side of FIG. 2, due to coma as well as to spherical aberration. In the case shown on FIG. 2, the focusing of the beams is adjusted to achieve perfect convergence at the screen S. This inevitably decreases the focusing effect imparted to each beam. Thus, the beams are under-focused so that the resulting beam spots are enlarged, as is apparent at the right-hand side of FIG. 2. On the other hand, if the focussing voltage is adjusted to sharply focus beam $B_2$ on screen S, this causes the beam spots $B_1$, $B_2$ and $B_3$ on the screen S to be scattered, as shown on FIG. 3. Therefore, special means have to be provided to converge or superimpose the beam spots which are thus scattered. However even in that case the beam spots $B_1$ and $B_3$ are deformed due to coma, as shown on the right-hand side of FIG. 3.

Figure 4:
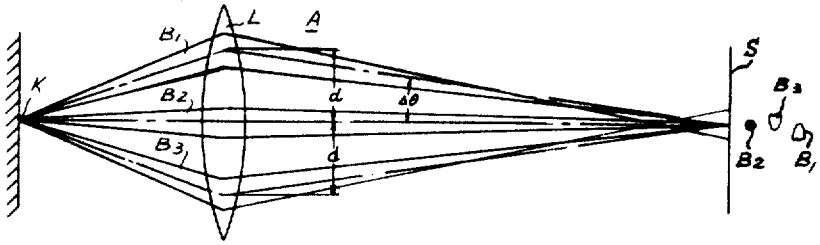
FIG. 4 is a diagrammatic view of the optical equivalent or analogy of still another single-gun, plural-beam system as previously proposed.

In an attempt to satisfy the contradictory conditions of focusing the three beams on screen S and of converging the three beams at the screen, it is conceivable that the three beams $B_1$, $B_2$ and $B_3$ could be emitted from a beam generating source K in three different or angularly displaced directions so as to be spaced apart from each other a distance d at the position of the main lens L, as illustrated on FIG. 4. Although the above two conditions can thus be simultaneously satisfied with only negligible spherical aberration, nevertheless the side beam spots $B_1$ and $B_3$ are blurred due to the coma, as shown at the right-hand side of FIG. 4, since the side beams pass through the main lens L at positions spaced from the axis of the lens by the distance d.

It will be seen from the above that cathode ray tubes employing the single-gun, triple-beam system as previously devised or proposed fail to satisfactorily meet the three-beam spot focusing condition and the three-beam spot converging condition and therefore have not been put to practical use as yet.

In the following detailed description of illustrative embodiments of single-gun, plural-beam systems according to this invention, particular reference is made to the use thereof in color picture tubes, but it is to be understood that the described single-gun, plural-beam systems according to this invention can be applied to any other cathode ray tubes in which plural electron beams are required.

Figure 5:
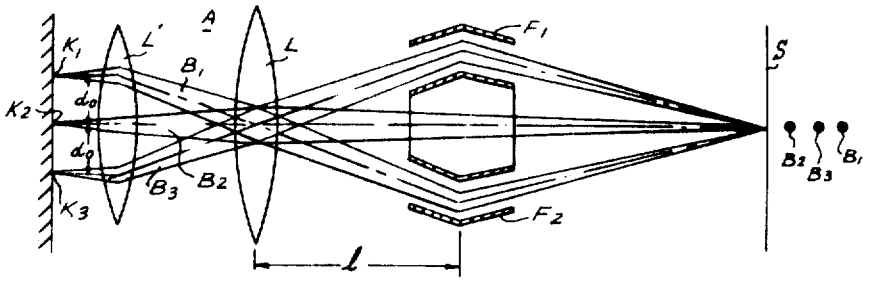
FIG. 5 is a similar diagrammatic view showing the optical equivalent of an electron gun according to an embodiment of this invention.

In the system according to this invention, as illustrated by its optical equivalent or analogy on FIG. 5, a single electron gun A includes equivalent beam generating sources $K_1$, $K_2$ and $K_3$ which are located on a straight line in a plane substantially perpendicular to the axis of the electron gun and spaced apart from each other by a distance $d_0$. These beam generating sources $K_1$, $K_2$ and $K_3$ emit three electron beams $B_1$, $B_2$ and $B_3$, respectively, which are refracted by means of a common auxiliary lens L' so as to be converged substantially at the optical center of a main lens L. Thus, the three beams $B_1$, $B_2$ and $B_3$ are made to cross each other at the optical center of the main lens L and then emerge from the lens L in divergent directions. Subsequently, the beams $B_1$ and $B_3$ which diverge from the optical axis and from the beam $B_2$ lying on such axis, are deflected toward the center beam $B_2$ by means of convergence deflectors $F_1$ and $F_2$ provided between the electron-receiving screen S and the main lens L and spaced from the latter by a distance 1, so that the three beam spots $B_1$, $B_2$ and $B_3$ on the screen are converged or superimposed on each other.

With the arrangement of FIG. 5, therefore, very small beam spots can be obtained since all three beams $B_1$, $B_2$ and $B_3$ pass through the center of main lens L, and thus the focused beam spots are prevented from being blurred due to the coma and spherical aberration. Consequently, a picture with a high resolution can be produced. Furthermore, utilization of the deflectors $F_1$ and $F_2$ advantageously facilitates the dynamic convergence correction with respect to the three beams. Although FIG. 5 represents the deflectors as being of the electrostatic type, they may be of the magnetic type as hereinafter described in detail.

Figure 6:
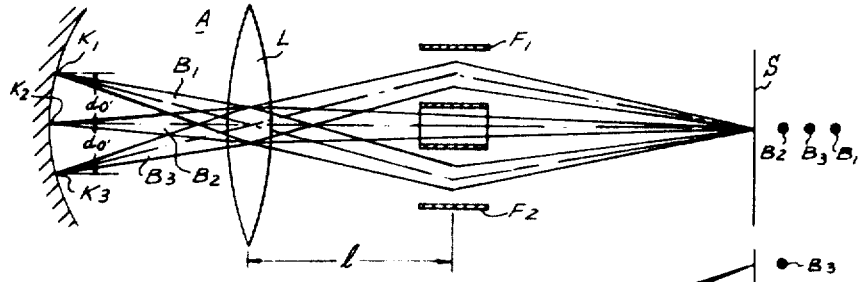
FIG. 6 is a view similar to that of FIG. 5, but illustrating an electron gun according to a second embodiment of this invention.

FIG. 6 shows the optical equivalent of a cathode ray tube according to a second embodiment of this invention in which a single electron gun A includes beam generating sources $K_1$, $K_2$ and $K_3$ arranged on an arcuate surface having its center at the optical center of a main lens L, and being spaced from each other by the straight distance $d_0'$. In this embodiment, the auxiliary lens L' of FIG. 5 is omitted, as the arrangement of the sources $K_1$, $K_2$ and $K_3$ on the described arcuate surface causes the three beams $B_1$, $B_2$ and $B_3$ to cross each other at the optical center of the main lens L, as in the embodiment shown on FIG. 5. Deflectors $F_1$ and $F_2$ are provided along the paths of the two beams $B_1$ and $B_3$ which cross each other within lens L and then follow diverging emergent paths, and such deflectors cause the beams $B_1$ and $B_3$ to converge and intersect the beam $B_2$ at the screen S. Thus, good resolution of the picture can be obtained in the same manner as described above in connection with FIG. 5.

Although the beam generating sources $K_1$, $K_2$ and $K_3$ in FIGS. 5 and 6 are spaced apart from each other by a distance $d_0$ or $d_0'$, along a straight line, it is possible to arrange these beam generating sources at the vertices of an equilateral triangle, in which case deflectors, as at $F_1$ and $F_2$, may be provided for each of the three beams or for only two of them. Preferably, the beam generating sources are arranged along a straight line, as shown. The reasons are that, with such preferred arrangement, the effective distance over which the beams are spaced apart from the optical axis can be minimized, the dynamic convergence correction can be easily effected, and asymmetrical convergence of the three beam spots on the screen can be prevented.

Figure 7:
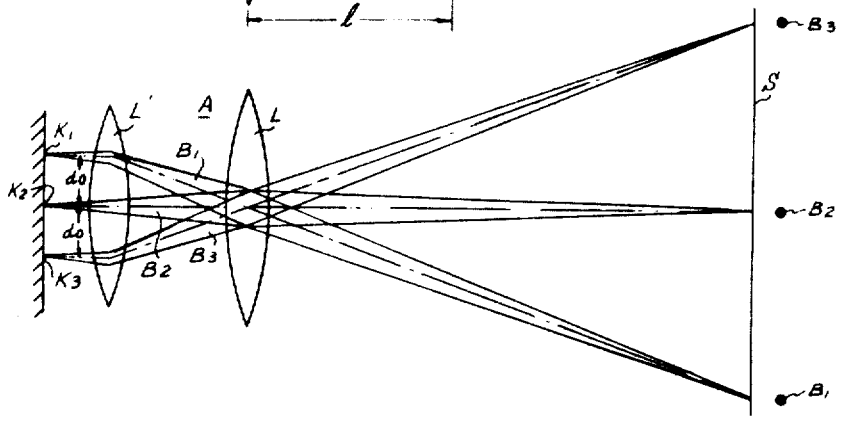
FIGS. 7 and 8 are diagrammatic views of the optical equivalents of still other embodiments of this invention.
Figure 8:
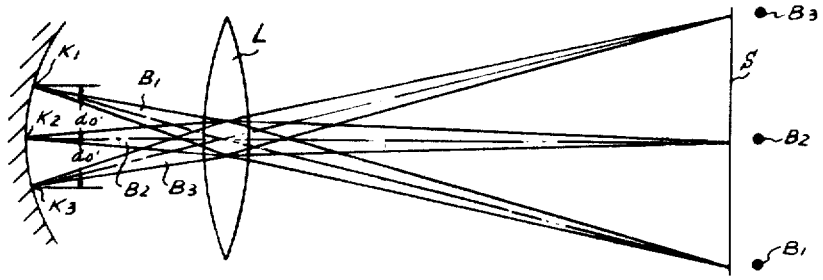

In the embodiments of this invention described above with reference to FIGS. 5 and 6, the three beams $B_1$, $B_2$ and $B_3$ are made to converge at the screen S. However, it is also possible to omit the deflectors $F_1$ and $F_2$ so that the three beams $B_1$, $B_2$ and $B_3$ cross each other at the optical center of the main lens L and thereafter continue along divergent paths so as to strike the screen at three different positions spaced from each other by a predetermined distance, as shown on FIGS. 7 and 8 which correspond to FIGS. 5 and 6, respectively. With the arrangements of FIGS. 7 and 8 the three beam spots on the phosphor screen are not affected by the spherical aberration and coma of the main lens, so that such beam spots need not be deformed as shown on FIGS. 2 to 4. When the beam spots are spaced apart on screen S, time differences corresponding to the three beam spot positions are imparted to the video signals modulating the three beams, thereby achieving correspondence between the three pictures produced on the phosphor screen by the three beams.

A particular example of the structure of an electron gun A corresponding to the optical analogy of FIG. 5 will now be described with reference to FIGS. 9 and 10 in which a cathode K constitutes the electron beam generating sources $K_1$, $K_2$ and $K_3$. A first control grid $G_1$ which, as shown on FIGS. 11 and 12, comprises three grid members $G_{11}$, $G_{12}$ and $G_{13}$ is supported in close, opposing relationship to the electron-emitting end surface of cathode K. The three grid members $G_{11}$, $G_{12}$ and $G_{13}$ have apertures $g_{11}$, $g_{12}$ and $g_{13}$, respectively, arranged on a straight line. A common grid $G_2$ having three apertures $g_{21}$, $g_{22}$ and $g_{23}$ formed therein is mounted in opposing, adjacent relationship to the grid $G_1$ with the apertures $g_{21}$, $g_{22}$ and $g_{23}$ thereof in alignment with the apertures $g_{11}$, $g_{12}$ and $g_{13}$, respectively. The grid $G_2$ may be cup-shaped to include a disk 1 (FIGS. 11 and 12) having the apertures $g_{21}$, $g_{22}$ and $g_{23}$ therein at spaced locations on a diametrical line 11—11 and a cylindrical side wall 2 extending from the periphery of disk 1 in the axial direction away from grid $G_1$. Arranged in order following the grid $G_2$ in the direction away from control grid $G_1$ are successive, open-ended, tubular grids or electrodes $G_3$, $G_4$ and $G_5$ (FIG. 9).

Electrode $G_3$ includes relatively small diameter end portions 3 and 4 and a larger diameter intermediate portion 5, and is supported with its end portion 3 extending into cup-shaped grid $G_2$ and spaced radially from side wall 2 of the latter. Electrode $G_4$ includes end portions 6 and 7 of a diameter larger than that of end portions 3 and 4 of electrode $G_3$ and an intermediate portion 8 of still larger diameter, and electrode $G_4$ is mounted so that end portion 4 extends into, and is spaced radially inward from end portion 6. Electrode $G_5$ includes end portions 9 and 10 of a diameter smaller than that of end portion 7 and an intermediate, relatively larger diameter portion 11, and electrode $G_5$ is mounted so that its end portion 9 extends into, and is spaced radially inward from end portion 7 of electrode $G_4$. The several electrodes $G_3$, $G_4$ and $G_5$, grids $G_1$, $G_2$ and cathode K are all assembled together in the above described relation by means of suitable supports 12 of insulating material. Further, a getter chamber GT is provided around the end portion 10 of electrode $G_5$.

In operating the electron gun of FIG. 9 appropriate voltages are applied to grids $G_1$ and $G_2$ and to electrodes $G_3$, $G_4$ and $G_5$. For example, a voltage of 0 to −400 v. is applied to the grid $G_1$ ($G_{11}$, $G_{12}$ and $G_{13}$), a voltage of 0 to 500 v. is applied to the grid $G_2$, a voltage of 13 to 20 kv. is applied to the electrodes $G_3$ and $G_5$, and a voltage of 0 to 400 v. is applied to the electrode $G_4$, with the voltage of cathode K as the reference. Therefore, the voltage distributions with respect to the grids and electrodes $G_1$ to $G_5$, and their lengths and diameters are substantially identical with those of a unipotential-single beam type electron gun which includes a first single grid member and a second grid provided with a single aperture. With the applied voltage distribution described above, an electron lens field is established between grid $G_2$ and the end 3 of electrode $G_3$ which corresponds to the auxiliary lens L' of FIG. 5, and an electron lens field corresponding to the main lens L of FIG. 5 is formed at the axial center of electrode $G_4$ by the electrodes $G_3$, $G_4$ and $G_5$. In one operation of the electron gun, bias voltages of 100 v., 0 v., 300 v., 20 kv., 200 v., 20 kv., are applied to the electrodes K, $G_1$, $G_2$, $G_3$, $G_4$ and $G_5$ respectively.

In order to cause convergence of the beams $B_1$ and $B_3$ which emerge from electrode $G_5$ along divergent paths, the electron gun of FIG. 9 further has deflecting means F that includes shielding plates P and P' provided in spaced opposing relationship to each other and extending axially from the free end of electrode $G_5$. Deflecting means F further includes converging deflector plates Q and Q', which are outwardly convexly bent or curved, for example, and are mounted in spaced opposing relation to the outer surfaces of shielding plates P and P', respectively. The plates P and P' and the plates Q and Q' are disposed so that the beams $B_1$, $B_2$ and $B_3$ pass between the plates P and Q, between the plates P and P' and between the plates P' and Q', respectively. A voltage equal to that imparted to the electrode $G_5$ is applied to the plates P and P', and a voltage lower than that applied to the plates P and P' by 200 to 300 v. is applied to the plates Q and Q'. Thus, deflecting voltage differences are applied between the plates P and Q and between the plates P' and Q' which respectively constitute the deflectors $F_1$ and $F_2$ of FIG. 5 and are adapted to impart the deflecting action to the beam $B_1$ and $B_3$, respectively, as described above in connection with FIG. 5.

Thus, the three beams $B_1$, $B_2$ and $B_3$ emanating from the cathode K are made to pass through the apertures $g_{11}$, $g_{12}$ and $g_{13}$ of grid members $G_{11}$, $G_{12}$ and $G_{13}$ and are modulated with three different signals applied between the cathode K and the grid members $G_{11}$, $G_{12}$ and $G_{13}$. The beams $B_1$, $B_2$ and $B_3$ pass through the common auxiliary lens L' which is formed mainly by the grid $G_2$ and electrode $G_3$ and cross each other at the center of the main lens L which is constituted mainly by the electrodes $G_3$, $G_4$ and $G_5$. Then the beams $B_1$, $B_2$ and $B_3$ pass between the plates Q and P, between the plate P and P′ and between the plates P′ and Q′ respectively, after having left the electrode $G_5$. Since plates P and P′ are at the same potential, beam $B_2$ is not deflected, but the beams $B_1$ and $B_3$ which emerge from lens L along divergent paths are deflected, so that the three beams $B_1$, $B_2$ and $B_3$ are made to converge at a point on the electron-receiving screen.

In the embodiment described above with reference to FIGS. 9 and 10, it is necessary that signals be separately applied to the three grid members $G_{11}$, $G_{12}$ and $G_{13}$ constituting the first grid $G_1$ since the three beam sources $K_1$, $K_2$ and $K_3$ are provided on the single cathode K. To meet such requirement, the three rectangular plate-like grid members $G_{11}$, $G_{12}$ and $G_{13}$ which are respectively formed with the apertures $g_{11}$, $g_{12}$ and $g_{13}$ have connector tabs 13 extending therefrom to receive the signals for modulating the electron beams independently of each other.

In order that the positional relationship of the apertures $g_{11}$, $g_{12}$ and $g_{13}$ of grid members $G_{11}$, $G_{12}$ and $G_{13}$ will be precisely predetermined, and that the apertures $g_{11}$, $g_{12}$ and $g_{13}$ will be concentrically aligned with apertures $g_{21}$, $g_{22}$ and $g_{23}$ of the second grid $G_2$ with a predetermined distance D being maintained between the second grid $G_2$ and the first grid members $G_{11}$, $G_{12}$ and $G_{13}$, two ceramic insulator pieces 14, each having a thickness D, are interposed between grids $G_1$ and $G_2$. Each of these insulator pieces 14 has a conductive layer 15 covering an entire surface thereof, as by metallizing that surface. Also, three conductive layers $M_1$, $M_2$ and $M_3$ extend across the width of the opposite surface of each insulator piece in uniformly longitudinally spaced relationship to each other. The insulator pieces 14 are disposed on the disk of the second grid $G_2$ in symmetrical, spaced relationship to the line 11—11 on which apertures $g_{21}$, $g_{22}$ and $g_{23}$ are arranged, and pieces 14 are integrally attached to the second grid $G_2$ at their conductor layers 15, as by brazing. The grid members $G_{11}$, $G_{12}$ and $G_{13}$ bridge the space between insulator pieces 14 and are secured, as by brazing to the conductive layers $M_1$, $M_2$ and $M_3$ provided on the insulator pieces.

FIG. 13 shows, by way of example, a single electron gun A′ according to the present invention applied to a chromatron type color picture tube. The electron gun A′ comprises three electrically separated cathodes $K_R$, $K_G$ and $K_B$ to which "red," "green" and "blue" video signals are respectively supplied. The three cathodes are arranged with their electron emitting surfaces in a straight line so as to be aligned with similarly arranged apertures $g_{1R}$, $g_{1G}$ and $g_{1B}$ in a plate-like grid $G_1$. A second cup-shaped grid $G_2$ has an end plate disposed adjacent grid $G_1$ and formed with three apertures $g_{2R}$, $g_{2G}$ and $g_{2B}$ which are respectively aligned with apertures $g_{1R}$, $g_{1G}$ and $g_{1B}$. As in the previously described embodiment, electron gun A′ has electrodes $G_3$, $G_4$ and $G_5$ arranged successively to define the auxiliary lens L′ and the main lens L.

Voltages based on the cathode voltages which are equal to those described above with reference to FIG. 9 are applied to the grids $G_1$ and $G_2$ and the electrodes $G_3$, $G_4$ and $G_5$ of the gun A′. Thus, beams $B_R$, $B_G$ and $B_B$ emanating from the cathodes $K_R$, $K_G$ and $K_B$ are made to pass through apertures $g_{1R}$, $g_{1G}$ and $g_{1B}$ of the first grid $G_1$ and apertures $g_{2R}$, $g_{2G}$ and $g_{2B}$ of the second grid $G_2$ and then through the auxiliary lens L′ by which the beams are made to cross each other at the optical center of the main lens L. The beams $B_R$ and $B_B$ emerge from main lens L along divergent paths. As in the previously described embodiment, convergence deflector means F comprising deflectors $F_1$ and $F_2$ formed by shielding plates P and P′ and deflecting plates Q and Q′ are along the paths of the three beams $B_R$, $B_G$ and $B_B$ from the main lens L. The three beams $B_R$, $B_G$ and $B_B$, after being acted upon by the convergence deflector means F, impinge on a color screen S, comprised of sets of "red," "green" and "blue" phosphor stripes $S_R$, $S_G$ and $S_B$ successively arranged on a face plate FP, after passing through a perforated electrode or shadow mask $G_P$ provided in front of color screen S and having a medium high voltage $V_M$ applied thereto. Voltages $V_P$ and $V_Q$ applied across the electrode plates P and Q and across the plates P′ and Q′ of convergence deflector means F are selected so that the three beams $B_R$, $B_G$ and $B_B$ are made to cross each other at the position of the mask $G_P$ and thus made to land only on the corresponding phosphor stripes $S_R$, $S_G$ and $S_B$. In this case, of course, the beams $B_R$, $B_G$ and $B_B$, while converging at the mask $G_P$, are focused on the screen S.

The usual horizontal and vertical deflection means, as indicated by the yoke D, are provided for horizontally and vertically scanning the three beams simultaneously with respect to the screen S as in the conventional picture tube.

Thus, by supplying "red," "green" and "blue" color video signals between the cathodes $K_R$, $K_G$ and $K_B$ and the grip $G_1$, respectively, the three beams $B_R$, $B_G$ and $B_B$ are intensity-modulated, whereby a color picture is produced on the color screen.

Although the convergence deflection means F described above in connection with the electron gun of each of FIGS. 9 and 13 is of the electrostatic type, it is to be understood that each such deflection means F of the electrostatic type may be replaced by one of a magnetic type for example, as illustrated on FIGS. 14A and B. Such deflection means F′ of the magnetic type is shown to comprise a magnetic shield member 16 which may be in the form of a tube of rectangular cross-section arranged axially after the electrode $G_5$ (which is not shown on FIG. 14A) so as to permit the passage therethrough of the center beam $B_2$ (FIG. 9) or $B_G$ (FIG. 13). Extending from one side 16a of shield member 16 are two magnetic plates 17a and 17b which are in opposing, spaced relation to each other so as to permit the passage therebetween of the beam $B_1$ or $B_R$, and a similar pair of magnetic plates 18a and 18b extend from the other side 16b of shield member 16 to permit the passage therebetween of the third beam $B_3$ or $B_B$. The edge portions of the plates 17a and 17b and of the plates 18a and 18b which are adjacent the shield member 16 are preferably bent so as to converge toward each other in the direction toward member 16, as particularly shown on FIG. 14B. Further, the outer edge portions 19a and 19b of the plates 17a and 17b are preferably bent outwardly away from each other to extend along the inner wall surface of the neck portion of the tube envelope indicated at N on FIG. 14B. The outer edge portions of plates 18a and 18b are similarly bent away from each other, as at 20a and 20b. Such bent outer edge portions 19a, 19b, 20a and 20b form magnetic poles. Provided at the outside of the tube neck N are electromagnetics 21 and 22 respectively including windings 23 and 24 on cores 25 and 26. The core 25 has magnetic pole portions 25a and 25b disposed in opposing relation to poles 19a and 19b, respectively, and the core 26 similarly has pole portions 26a and 26b in opposing relation to poles 20a and 20b, respectively.

With the above described arrangment, the three beams $B_1$, $B_2$ and $B_3$ which have been made to cross each other at the optical center of the main lens L and then emerge from the electrode $G_5$ respectively pass between the opposing magnetic plates 17a and 17b, through the shield member 16 and between the opposing magnetic plates 18a and 18b. The beam $B_2$ is not deflected since it is shielded from the external magnetic field by the member 16, while the side beams $B_1$ and $B_3$ are deflected by reason of the magnetic flux distributions between the magnetic plates 17a and 17b and between the plates 18a and 18b which result from static convergence current flow through the electromagnets 21 and 22, whereby the three beams $B_1$, $B_2$ and $B_3$ are made to converge as desired, either at a point on the phosphor screen or on the shadow mask in front of the latter. Of course, it is possible to superimpose dynamic convergence currents on the static convergent currents flowing through the electromagnets 21 and 22 so that, in that case, separate dynamic convergence is not required.

Due to the fact that the inner edge portions of magnetic plates 17a, 17b and 18a, 18b adjacent the sides 16a and 16b of shield member 16 are convergent or inwardly bent, as shown in FIG. 14B, the beams are made to come very close to each other, that is, they are made to come very close to the magnetic shield member 16 so that it is possible to effectively prevent disturbance of the magnetic field at the positions of the beams $B_1$ and $B_3$ by the magnetic flux passing from the magnetic plates 17a, 17b, 18a, 18b to the magnetic shield member 16. Thus, it is possible to effectively prevent distortion of the beam spots on the phosphor screen. If the distance between the opposing magnetic plates is a, the length of the bent portion of each magnetic plate is c, the distance between the free edges of the converging bent inner portions is b, and the relatively small dimension of the rectangular cross-section of the magnetic shield member is d, the best results have been attained when $b/a=0.625$, $d/2a=c/a=0.325$ and the angle between the inner edge bent portions is in the range of 30° to 60°. If the inner edge portions of the magnetic plates adjacent the sides of the magnetic shield member 16 are not bent, the magnetic field is nonuniformly distributed by reason of the fact that the magnetic flux at the positions of the beams $B_1$ and $B_3$ is curved under the influence of the magnetic flux passing from the magnetic plates 17a, 17b and 18a, 18b toward the magnetic shield member 16. The distorting effect of such non-uniform magnetic field becomes great especially when the distance between the adjacent beams is reduced so that the beams are made to come close to the side surfaces of the magnetic shield member 16. Such distorting effect can be effectively avoided by bending the magnetic plates as described above.

It will be readily apparent that, if desired, the convergence electromagnets 21 and 22 can be replaced by permanent magnets.

In the foregoing, electron guns embodying this invention have been described as being applied specifically to color picture tubes in which a single gun is employed to produce three electron beams which are intensity modulated with the usual "red," "green" and "blue" color signals. However, it is obvious that an electron gun in accordance with this invention can be used in any other cathode ray tube requiring a plurality of beams which are to be focused at a common spot or at separate spots on an electron-receiving screen.

Although illustrative embodiments of electron guns according to this invention have been described in detail herein with reference to the accompanying drawings, it is to be understood that the invention is not limited to those precise embodiments, and that various changes and modifications may be made therein by one skilled in the art without departing from the scope or spirit of the invention as defined in the appended claims.

What is claimed is:

1. In a cathode ray tube having an electron-receiving screen *and a beam-selecting structure adjacent said screen,* a single electron gun comprising beam producing means directing a plurality of electron beams toward said screen, means to cause said beams to intersect each other at a *single* point in said tube intermediate said beam producing means and said *beam-selecting structure* [screen], and *main* focusing lens means common to all of said beams and being arranged in the paths of the beams [to focus the latter] *for final focusing of each of said beams substantially* on said screen, said *main focusing* lens means having an optical center and being located to dispose said optical center substantially at said point at which the beams intersect, thereby to avoid the effects of coma and spherical aberration at said screen.

2. Apparatus for the reproduction of images in color, comprising an electron receiving screen, *a beam-selecting structure adjacent said screen,* an electron gun, said electron gun having means for generating a plurality of electron beams directed toward said screen, means for modulating said electron beams with color video signals, means to cause said electron beams to intersect *each other* at a *single* location between said electron beam generating means and said *beam-selecting structure* [receiving screen], *main* focusing lens means [positioned to focus] *common to all of* said beams *for final focusing of said beams substantially* on said screen, and said *main* focusing lens means having an optical center and being positioned to dispose the optical center thereof substantially at said location at which the electron beams intersect.

3. An electron gun for use in a cathode ray tube having a receiving screen *and a beam-selecting structure adjacent said screen,* said gun comprising beam generating means for producing a plurality of electron beams, means to cause said beams to intersect *each other at a single location intermediate said beam generating means and said beam-selecting structure, main* focusing lens means *common to all of said beams* [positioned] to *finally* focus said beams *substantially* on said screen, said *main* focusing lens means having an optical center, and said *main* focusing lens means being positioned to dispose the optical center thereof substantially at [the] *said* location at which said beams intersect whereby the effects of certain optical aberrations are diminished *at said screen.*

4. An electron gun for use in a cathode ray tube, said gun comprising beam generating means for producing a plurality of electron beams, means to cause said beams to intersect *each other* substantially at a common *single* location *which is spaced from said beam generating means, main* focusing lens means operative to *finally* focus said beams in a plane spaced from said location at which said beams intersect, said *main* focusing lens means having an optical center, and said *main* focusing lens means being positioned to dispose the optical center thereof substantially at the location at which said beams intersect whereby the effects of certain optical aberrations are diminished *at said plane.*

5. A cathode ray tube comprising beam producing means for producing a plurality of electron beams, a receiving screen positioned to have said beams impinge thereon, *a beam-selecting structure adjacent said screen,* means to cause said beams to intersect *each other* at a *single* location in said tube between said beam producing means and said *beam-selecting structure* [screen], *main* focusing lens means [positioned to focus] *common to all of* said beams *for final focusing of the latter substantially* on said screen, said *main* focusing lens means having an optical center, and said *main* focusing lens means being positioned to dispose the optical center thereof substantially at the location at which said beams intersect whereby the effects of certain optical aberrations are diminished *at said screen.*

6. A cathode ray tube according to claim 5, in which said *main focusing* lens means includes a plurality of electrodes at different electrical potentials to establish an electron lens field for said *final* focusing of the beams passing therethrough.

7. A cathode ray tube according to claim 5, in which said beam producing means includes individual beam sources, and said means to cause said beams to intersect each other at said location supports said individual beam sources with the beams issuing therefrom converging to said location.

8. A cathode ray tube according to claim 5, in which said beams issue substantially parallel to each other from said beam producing means, and said means to cause the beams to intersect at said location of the optical center includes auxiliary lens means disposed between said beam producing means and said focusing lens means and causing convergence of the beams to said location.

9. A cathode ray tube according to claim 8, in which said auxiliary lens means includes electrodes at different electrical potentials to establish an electron lens field through which the beams pass for said convergence at said location.

[10. A cathode ray tube according to claim 5, in which deflection means are located between said focusing lens means and said screen to deflect those beams which emerge from said focusing lens means along divergent paths whereby to cause convergence of said beams at a common area on said screen.]

11. A cathode ray tube according to claim [10,] *5* in which said screen includes *sets of different color phosphors and said beam-selecting structure is* [a phosphor screen member and] a perforated shadow mask in front of said [phosphor] screen [member], [and] in which said lens means focuses all of said beams at said [phosphor] screen [member], *and in which deflection means are located between said main focusing lens means and said shadow mask to deflect those beams which emerge from said main focusing lens means along divergent paths* and said deflection means converges all of said beams to a common location at said shadow mask.

12. A cathode ray tube according to claim *5* [10], *in which deflection means are located between said main focusing lens means and said beam-selecting structure to deflect those beams which emerge from said main focusing lens means along divergent paths whereby to cause convergence of said beams at a common area of said beam-selecting structure, and* in which said deflection means includes spaced plates at different electrical potentials disposed at opposite sides of each of said divergent paths to electrostatically deflect the beam in the respective path.

13. A cathode ray tube according to claim *5* [10], *in which deflection means are located between said main focusing lens means and said beam-selecting structure to deflect those beams which emerge from said main focusing lens means along divergent paths whereby to cause convergence of said beams at a common area of said beam-selecting structure, and* in which said deflection means includes means establishing a magnetic field across each of said divergent paths to magnetically deflect the beam in the respective path.

14. A cathode ray tube according to claim *5* [10], in which said beam producing means defines sources for three of said beams, with one of said sources being at the optical axis of said *main* focusing lens means and the other two sources being equally spaced from said one source at opposite sides of the latter on a straight line extending diametrically across said optical axis so that only the beams from said other two sources follow divergent paths upon emerging from said focusing lens means, *and in which deflection means are located between said main focusing lens means and said beam-selecting structure to deflect those beams which emerge from said main focusing lens means along said divergent paths whereby to cause convergence of said beams at a common area of said beam selecting structure.*

15. A cathode ray tube according to claim 14, in which said deflection means includes a pair of first plates at equal electrical potential disposed at opposite sides of said optical axis for the passage therebetween of the beam from said one source upon emergence thereof from said *main* focusing lens means, and second plates spaced outwardly from said first plates for the passage between said first and second plates of said beams from said other two sources, said second plates being at an electrical potential different from that of the first plates to electrostatically deflect the respective beams from said other two sources in the direction toward said optical axis.

16. A cathode ray tube according to claim 14, in which said deflection means includes a tubular mangetic shield arranged along said optical axis for the passage therethrough of the beam from said one source upon emergence from said *main focusing* lens means, pairs of spaced magnetic plates extending outwardly from opposed sides of said shield for the passage between said pairs of plates of the beams from said other two sources, and magnet means operatively associated with said pairs of plates to establish, between the plates of each pair, a magnetic field for deflecting the beam passing therethrough toward said optical axis.

17. A cathode ray tube according to claim 16, in which the plates of each of said pairs have inner edge portions which converge toward each other in the direction toward the adjacent side of said shield for minimizing distortion of the respective beams by non-uniformity of the magnetic field between said plates.

18. A cathode ray tube according to claim 5, in which said beam producing means includes cathode means emitting electrons, and first and second grid means arranged successively in adjacent, opposing relation to said cathode means and to each other, respectively, and having aligned apertures for each of said beams to form the latter parallel to each other.

19. A cathode ray tube according to claim 18, in which said second grid means is in the form of a single plate having all of the respective apertures therein, said *main* focusing lens means includes a plurality of tubular electrodes arranged successively in order after said second grid means and being at different electrical potentials to establish an electron lens field for the *final* focusing of all of the beams passing therethrough, and said means to cause the beams to intersect at said location includes an annular side wall extending from the periphery of said plate of the second grid means and being at an electrical potential different from that of the next adjacent electrode of said *main* focusing lens means to establish an auxiliary electron lens field for converging the beams formed in parallel relation to each other.

20. A cathode ray tube according to claim 18, in which said cathode means includes a single cathode member having an electron emitting surface, said first grid means includes a plurality of grid members each corresponding to one of said beams and having a respective aperture therein, said grid members of the first grid means being disposed in confronting, adjacent relation to said electron emitting surface, said second grid means includes a single plate in confronting, adjacent relation to said members of the first grid means, and insulating and spacing members are interposed between, and bonded to said grid members of the first grid means and said plate for maintaining predetermined relative spacing and alignment of said apertures in the first and second grid means.

21. An electron gun for use in a cathode ray tube, said gun comprising beam generating means for producing a plurality of electron beams, means to cause said beams to intersect *each other at a single location spaced from said beam genearting means, main* focusing lens means [positioned to focus] *for the final focusing of* said beams, said *main* focusing lens means *being formed by a plurality of electrical elements and* having an optical center, *said optical center being located along the axis of said main focusing lens means where the effects of optical aberrations are substantially a minimum,* and said focusing lens means being positioned to dispose the optical center thereof substantially at [the] *said* location at which said beams intersect whereby the effects of certain optical aberrations *in the focused beams* are diminished.

22. An electron gun in accordance with claim 21 in which said beam generating means includes one cathode for emitting electrons and at least two grid members positioned in opposing relationship to the electron emitting surface of said cathode.

23. An electron gun in accordance with claim 21 in which said [individual] *electron* beams *as* generated by said beam genearting means *each has* [*have*] a cross-sectional areas less than the cross-sectional area *thereof* at the optical center of said *main* focusing lens *means* where said beams intersect.

24. An electron gun according to claim 21, having deflection means for deflecting those beams which emerge from said *main* focusing lens means along paths diverging from the optical axis of said *main* focusing lens means to cause convergence [for] *of all* of said beams in a common location *beyond said gun.*

25. An electron gun in accordance with claim 24 in which said beam producing means includes cathode means emitting electrons, and first and second tubular grid means arranged successively in adjacent, opposing relation to said cathode means and to each other respectively and having aligned apertures for each of said beams to form the latter parallel to each other.

26. An electron gun in accordance with claim 21 in which said *main focusing* lens means includes a plurality of electrodes at different electrical potentials to establish an electron lens field therebetween for said *final* focusing of the beams passing therethrough.

27. An electron gun in accordance with claim 26 in which said *electrodes of said main focusing* lens means [further] *include* [includes] at least two tubular electrodes arranged in successive order with said electron lens field being established therebetween.

28. An electron gun in accordance with claim 27 in which said beams issue substantially parallel to each other from said beam producing means, and said means to cause the beams to intersect includes auxiliary lens means disposed between said beam producing means and said *main* focusing lens means.

29. An electron gun in accordance with claim 28 in which said auxiliary leans means includes at least two tubular electrodes at different electrical potentials to establish an electron lens field through which the beams pass for convergence.

30. An electron gun in accordance with claim 21 in which said means to cause the beams to intersect includes beam generating means arranged on an arcuate surface whereby said beams issue from said beam generating means in a manner to intersect *substantially* [substantively] at the optical center of said *main* focusing lens means.

31. An electron gun in accordance with claim 30 in which the center of said arcuate surface is on the same axis as the optical center of said *main* focusing lens *means.*

32. An electron gun in accordance with claim 21 in which said beam generating means includes at least two cathodes for emitting electrons and one grid member positioned in opposing relationship to the electron emitting surfaces of said cathodes.

33. An electron gun in accordance with claim 32 in which said cathodes are arranged in a straight line and aligned with apertures provided in said grid member.

References Cited

The following references, cited by the Examiner, are of record in the patented file of this patent or the original patent.

UNITED STATES PATENTS

| | | | |
|---|---|---|---|
| 3,596,126 | 7/1971 | Yoshida et al. | 313—86 |
| 2,679,614 | 5/1954 | Friend | 315—13 |
| 2,690,517 | 9/1954 | Nicoll et al. | 313—70 |
| 2,711,493 | 6/1955 | Lawrence | 313—70 X |
| 2,862,144 | 11/1958 | McNaney | 313—69 X |
| 2,887,598 | 5/1959 | Benway | 313—70 |
| 3,011,090 | 11/1961 | Moodey | 313—70 X |
| 3,325,675 | 6/1967 | Sanford | 315—13 |
| 3,363,128 | 1/1968 | De France et al. | 313—77 |

ROBERT SEGAL, Primary Examiner

U.S. Cl. X.R.

315—16